Oct. 20, 1964
W. A. BURTIS
3,153,427
BUTTERFLY CHECK VALVE
Filed Sept. 14, 1961
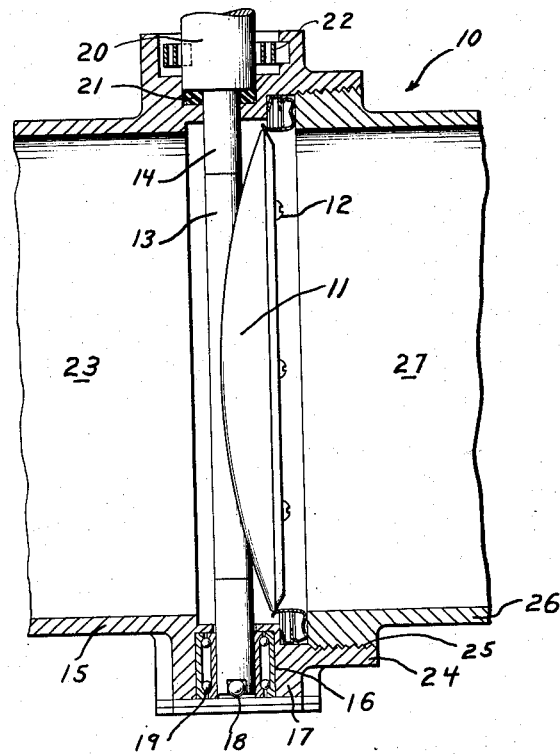
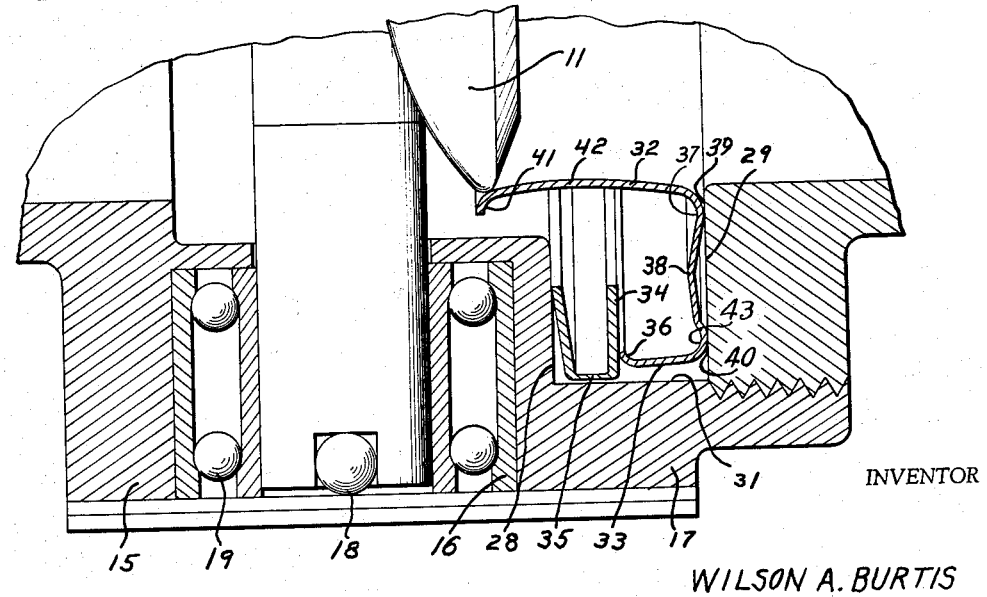
INVENTOR
WILSON A. BURTIS
BY
ATTORNEY

United States Patent Office 3,153,427
Patented Oct. 20, 1964

3,153,427
BUTTERFLY CHECK VALVE
Wilson A. Burtis, Los Angeles, Calif., assignor to Aero-Flow Dynamics, Inc., a corporation of New York
Filed Sept. 14, 1961, Ser. No. 138,077
2 Claims. (Cl. 137—527)

This invention relates generally to butterfly valve structures and more particularly to an improved butterfly check valve.

In designing and constructing a valve unit, the pressure and temperature conditions which the valve will encounter in use must be considered. In many cases, a valve will encounter fluid or gas pressures and temperatures of high magnitude, and will be subjected to the abrasive action of sediment contained within a fluid and gas stream. When such is the case, the valve should incorporate seals which are constructed of a material not easily affected by pressure, temperature or abrasion. Ideally, the sealing surfaces within a valve structure might be constructed from suitable metals, but varying temperature conditions, causing non-symmetrical expansion or contraction of the valve housing and manufacturing conditions have made it impractical to normally expect that an efficient seal could be obtained between metal surfaces. The usual practice has, therefore, been to rely upon flexible valve seats secured to the valve housing or upon flexible members secured to the valve discs to compensate for manufacturing tolerances or for the unsymmetrical expansion and contraction of the valve parts.

It is a primary object of this invention to provide an improved butterfly check valve wherein an improved metal to metal seal is provided between a butterfly valve disc and valve seat.

A more specific object of this invention is to provide a butterfly check valve wherein the seat for the valve disc is rendered both shiftable and pressure responsive and will compensate for unsymmetrical dimensional change with temperature to provide an efficient seal between the disc and the seat when the valve is in the closed position.

Another object of this invention is to provide a butterfly check valve having a valve seat assembly which includes a pair of coacting metal elements operating cooperatively to obtain an efficient seal with a butterfly valve disc while maintaining an efficient seal with the valve body.

A further object of this invention is to provide a butterfly check valve which opens in response to fluid pressures to permit fluid flow in one direction, but which closes in response to a backflow of fluid to prohibit fluid flow in the opposite direction.

A still further object of this invention is to provide a butterfly check valve having a butterfly valve disc which is suitably biased in the closed direction but which is responsive to fluid pressure to permit varying degrees of fluid flow in one direction while prohibiting all fluid flow in the opposite direction.

With the foregoing and other objects in view, this invention resides in the following specification and appended claims, certain details of construction being illustrated in the accompanying drawings in which:

FIGURE 1 is a fragmentary, partially sectioned view of the butterfly check valve of this invention; and FIGURE 2 is an enlarged, fragmentary view of the lower portion of FIGURE 1 illustrating in section the valve seat for the butterfly valve of this invention.

Referring now to the drawings, the butterfly check valve of the present invention indicated generally at 10 includes a butterfly valve disc 11 which is secured by means of screws 12 or other suitable means to the offset portion 13 of an operating shaft 14. The shaft 14 extends outwardly in opposite directions through a valve body member 15, the lower end of the shaft being rotatably supported in the body member 15 by a ball bearing assembly 16. Bearing assembly 16 rests in a recessed boss 17 which is provided in the body 15, and includes a lower thrust ball bearing 18 upon which the shaft 14 is held for rotation by bearings 19.

The upper portion of the shaft 14 is provided with an integral plane bearing 20 which rotatably supports the upper end of the shaft 14 in the body member 15. A seal 21 may be provided about the shaft 14 adjacent the bearing 20. An annular spring 22 is attached to the plane bearing 20 and extends between the plane bearing and the body member 15.

For non-biased valve operation, the plane bearing 20, seal 21, and spring 22 may be replaced by an upper ball bearing assembly similar to lower bearing assembly 16. In this case, the upper end of the shaft 14 would be supported by an upper bearing assembly in the same manner that the lower end of the shaft is supported by bearing assembly 16. Suitable adjustable stops should be provided at the ends of the shaft 14 to replace the annular spring 22 and to limit the degree of shaft rotation. These stops condition the angular open position of the valve disc 11 to permit the disc to be easily reseated by a backflow of fluid. The offset manner in which the valve disc 11 is secured to the shaft 14 and the mounting of the shaft 14 in the bearings 16 and 20 so that the axis of the shaft is offset from the longitudinal axis of a circular passage 23 through the body member 15 is fully described in my copending application Serial No. 812,258, filed May 11, 1959, now Patent No. 3,077,331, entitled Butterfly Valve.

The body member 15 is provided with an offset integral sleeve extension portion 24 having internal threads 25 to threadably engage and receive a second body portion 26 of the valve assembly. Body portion 26 defines a circular internal passage 27 and constitutes the upstream or pressure side of the valve relative to the disc 11. Body member 15 is provided with a shoulder 28, while body member 26 is provided with a shoulder 29. Upon full engagement of the body members 26 and 15 at the threads 25, the shoulders 28 and 29 are spaced to define a cavity or recess 30. The interior surface of the body portion 15 between the shoulders 28 and 29 provides a bottom wall 31 for the recess 30.

Referring particularly to FIGURE 2, a resilient metal valve seat 32 is positioned within the recess 30 and is capable of limited movement in a plane transverse to the axis of passage 27. Valve seat 32 has a lower wall portion 33 which extends between the shoulder 29 of the body member 26 and a vertical wall 34 of a U-shaped backing ring 35. At the point of sealing contact with the wall 34, the seat wall 33 is turned upwardly in an arcuate fashion at 36 whereby the engagement thereof with the wall 34 is substantially tangential in character. The U-shaped backing ring 35 has an external diameter somewhat less than the internal diameter of the body portion 15 at the wall 31 of the recess 30 whereby the ring 35 is capable of expanding radially within the recess when the body halves 15 and 26 are joined to prevent binding of the ring 35 on the wall 31. The ring 35 is preferably composed of corrosion resistant metal and is inherently resilient so as to cooperate with and bias the valve seat 32 to form a leak free valve seat assembly.

The end of the valve seat bottom wall 33 opposite the backing ring 35 forms a lower arcuate section 43 which is connected to an upper arcuate section 37 by an upwardly directed wall portion 38. Arcuate sections 43 and 37 contact the shoulder 29 at fulcrum points 39 and 40. The free terminus of arcuate section 37 is directed axially downstream of the valve and terminates in a downwardly directed lip portion 41 to provide a resilient seat or seal member 42 for the valve disc 11. Lip 41 is spaced above the upper wall of shoulder 28 to permit the flow of fluid beneath the valve seat 42.

In the operation of the butterfly check valve of the present invention, when fluid under pressure is introduced through the interior portion 27 of the body member 26, the fluid will contact the valve disc 11 causing the shaft 14 to rotate and the valve seal 42 to flex downwardly about fulcrum point 40, thus unseating the valve disc from the valve seat 32. When the annular spring 22 and plane bearing 20 of FIGURE 1 are used in place of an upper ball bearing assembly to support shaft 14, the rotation of shaft 14 will cause the bias of the annular spring 22 to increase, so that the degree to which the valve disc 11 is removed from the valve seat 32 is dependent upon the pressure of the fluid through the body 26 which opposes the bias of the spring 22. Thus spring 22 acts as a stop means to limit the degree of rotation of the shaft 14. If an upper ball bearing assembly is utilized, the fluid pressure on the valve disc 11 will cause rotation of the shaft 14 until a stop member provided thereon is encountered.

A sudden back flow of fluid through the inner portion 23 of the body section 15 toward the body section 26 causes the valve disc 11 to reseat in the valve seat 32 under the action of fluid pressure. If spring 22 is utilized, the bias of the spring aids in rapidly seating disc 11. The valve seat 32 is capable of limited transverse movement to insure that a tight seal will be provided around the entire periphery of the valve disc 11. When the valve disc 11 is seated in the position illustrated by FIGURES 1 and 2 by the action of a reverse flow of fluid, fluid is permitted to flow beneath the lip 41 and causes pressure to be applied to the underside of the sealing surface 42. This causes surface 42 to flex inwardly against the valve disc 11, thus providing a fluid tight seal therebetween. Seals are also provided between the backing ring 35 and shoulder 28, the front wall 34 of the backing ring 35 and curved section 36 of lower valve seat wall 33, and between the shoulder 29 and the arcuate sections 43 and 37.

In use, the backing ring 35 will place the lower wall 33 of the valve seat 32 under a preselected amount of spring bias which is sufficient to aid in sealing the valve but which will not prevent desirable radial shifting of the valve seat 32. This ability of the valve seat 32 to shift radially within the recess 30 compensates for expansion and contraction of valve parts due to temperature changes within and about the valve housing and inconsistencies in the symmetrical shapes of the parts and the formations of cast materials produced by general manufacturing methods. Since the valve disc 11 tangentially engages the sealing surface 42 in the area of the lip portion 41, any binding of the disc with the seat due to differential temperatures between the two is prevented. If there is a temperature differential between the parts, the disc 11 will move around the radius of the lip 41 slightly, and the point of contact on the surface 42 will be varied. This movement of the valve disc also compensates for wear, as the disc is capable of contacting sealing surface 42 at various points.

It should be noted that the valve assembly 10 is adapted for free operation under the influence of fluid pressures through the bodies 15 and 26, or the valve may be partially controlled by suitable drive means operatively connected to the shaft 14.

It will thus be apparent to those skilled in the art that the invention provides a simple and effective butterfly check valve construction incorporating a metallic valve disc and valve seat for providing a fluid tight seal. Obvious modifications of the check valve assembly disclosed by this invention such as would occur to one skilled in the art, are deemed to be within the concepts presented herein and within the scope of the appended claims.

What is claimed is:

1. A butterfly check valve comprising: a valve body having a through passage between an inlet and an outlet, an annular recess in said passage, a valve seating assembly including a resilient metallic valve seating ring and a resilient metallic backing ring, said seating ring having a first curved annular body portion in frictional tangential line-contact with the upstream wall of said recess along concentric lines, one of said lines being closely adjacent the edge of said recess, clearance provided between said seating ring and the bottom of said recess to permit transverse shifting of said entire seating ring within said passage, said resilient backing ring coacting with the downstream wall of said recess and the terminus portion of said first body portion to place a predetermined resilient bias on said seating ring, said seating ring further including a second annular body portion coextensive with said first body portion and extending from said one point of frictional contact generally axially of said passage in a downstream direction and spaced from the walls of said passage, said second body portion terminating in a curved lip portion, a valve disc within said pasasge and downstream of said recess, and means for resiliently biasing said disc to a closed position in contact with said curved lip portion, said plurality of points of frictional contact providing the sole attachment between said seating ring and said valve body.

2. A butterfly check valve comprising: a valve body having a through passage between an inlet and an outlet, an annular recess in said passage, a resilient valve seating ring, a resilient backing ring, said seating ring having a first curved body portion in frictional line contact with the wall of said recess towards said inlet, clearance provided between said seating ring and said recess to permit transverse shifting of said entire seating ring within said passage, said backing ring coacting with the wall of said recess towards said outlet and the terminus portion of said first body portion to place a predetermined bias thereon, said seating ring further including a second annular body portion co-extensive with said first body portion and extending from the wall of said recess towards said inlet axially of said passage in a downstream direction and spaced from the walls of said passage, said second body portion terminating in a curved lip portion, a pivotally mounted valve disc, and means for resiliently biasing said disc into sealing contact with said lip portion.

References Cited in the file of this patent

UNITED STATES PATENTS

| 2,624,363 | Boller | Jan. 6, 1953 |
| 2,673,061 | Broz | Mar. 23, 1954 |
| 2,990,848 | Wilson | July 4, 1961 |
| 3,077,331 | Burtis | Feb. 12, 1963 |

FOREIGN PATENTS

| 563,416 | Great Britain | Aug. 14, 1944 |
| 1,247,010 | France | Oct. 17, 1960 |